United States Patent [19]

Uematsu et al.

[11] Patent Number: 5,548,360
[45] Date of Patent: Aug. 20, 1996

[54] MECHANISM FOR DETECTING DX ENCODED FILM DATA OF CAMERA

[75] Inventors: Kimio Uematsu, Tokyo; Yoshinori Ishikawa, Sendai, both of Japan

[73] Assignee: Nikon Corporation, Tokyo, Japan

[21] Appl. No.: 523,146

[22] Filed: Sep. 5, 1995

[30] Foreign Application Priority Data

Sep. 7, 1994 [JP] Japan .................... 6-213412

[51] Int. Cl.⁶ .................................................. G03B 7/24
[52] U.S. Cl. ............................................................ 354/21
[58] Field of Search ..................... 354/21, 288; 352/78 C

[56] References Cited

U.S. PATENT DOCUMENTS

4,582,408  4/1986  Miki et al. ........................ 354/21
4,714,332  12/1987  Eguchi et al. .................... 354/21
4,783,671  11/1988  Haraguchi ........................ 354/21
4,982,209  1/1991  Pearson ........................... 354/21

Primary Examiner—A. A. Mathews

[57] ABSTRACT

A DX encoded film data detecting mechanism has a first contact member the tip portion formed with an opening at its tip portion protruding by a predetermined amount so as to come in contact with a film data pattern from an opening formed in a wall of a film magazine of a camera. The mechanism also has a second contact member disposed in the opening of the first contact member and protruding by a predetermined amount so as to come in contact with the film data pattern.

7 Claims, 8 Drawing Sheets

MECHANISM FOR DETECTING DX ENCODED FILM DATA OF CAMERA

BACKGROUND OF THE INVENTION

1. Field of the Invention

The present invention relates to a data detecting mechanism for detecting film data on an outer periphery of a DX encoded film magazine.

2. Related Background Art

With a spread of a DX encoded film of nowadays, automatic setting of a film speed or sensitivity is facilitated enough to make it the mainstream. The principle of a structure thereof is that a response of an electric signal is detected from a camera-body-side contact provided on a film magazine and a data record pattern on the outer periphery of the film magazine by making use of an electrical conduction, and the film sensitivity is thus read.

Herein, a conventional DX encoded film data detecting mechanism will be explained with reference to the drawings.

Figure 1:
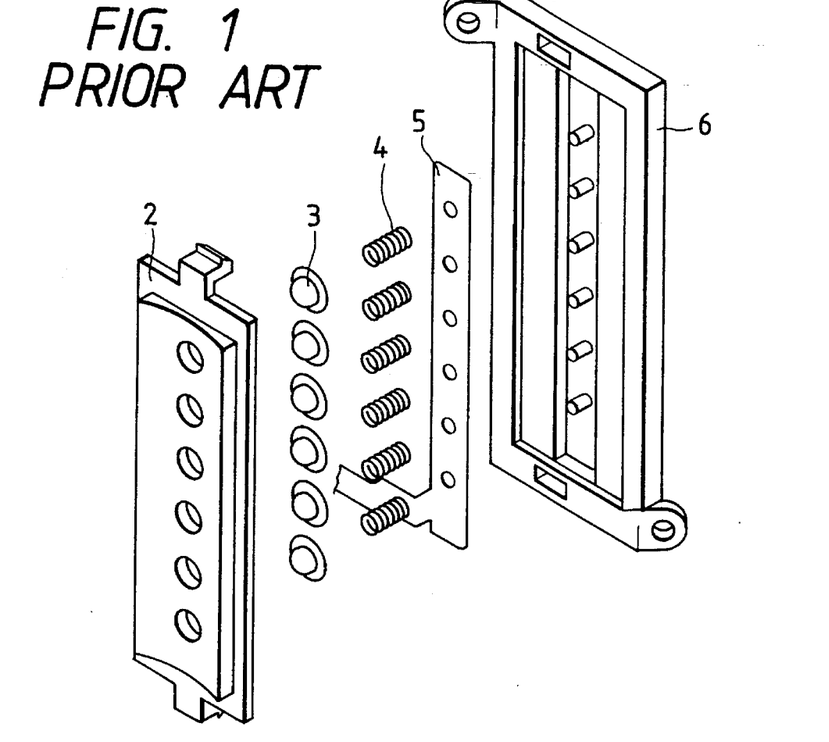
FIG. 1 is a fragmentary perspective view illustrating a conventional DX encoded film data detecting mechanism.

FIG. 1 is a fragmentary perspective view illustrating the conventional DX film data detecting mechanism. Referring to FIG. 1, a flexible printed board 5 is fitted to a plurality of protrusions formed on a holding plate 6, thus locating the printed board 5. Contacts 3 are inserted into a plurality of through-holes formed in a contact holding member 2 enough to protrude from the opposite surface. Coil springs 4 are inserted in unillustrated recessed portions of the contacts 3. These respective members are combined to constitute the conventional data detecting mechanism.

Figure 2:
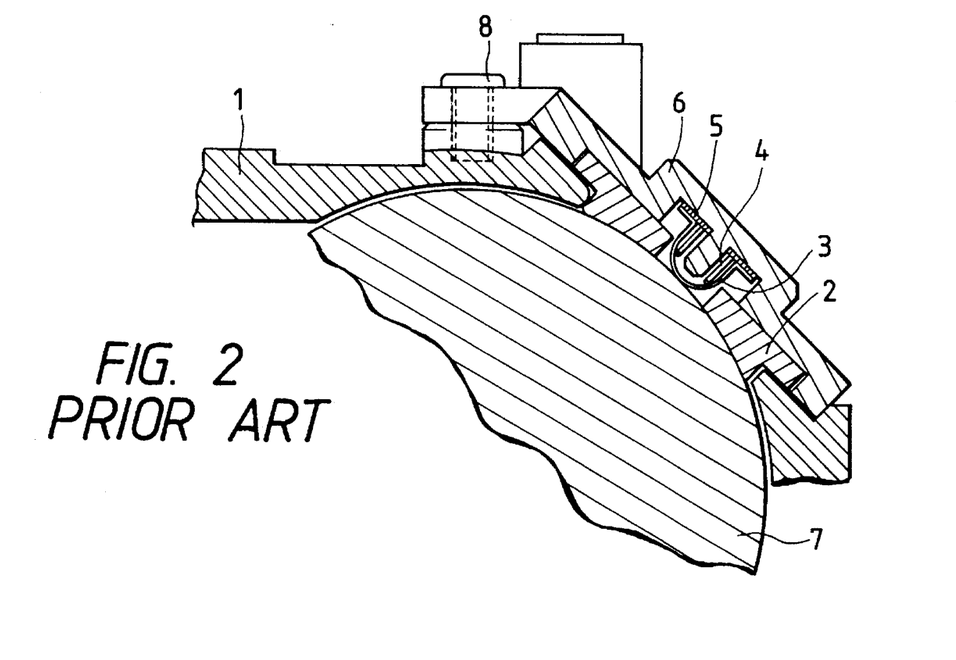
FIG. 2 is a sectional view illustrating the conventional DX encoded film data detecting mechanism when a magazine is loaded.

FIG. 2 is a sectional view showing the DX encoded film data detecting mechanism when the magazine is loaded. Referring to FIG. 2, the data detecting mechanism is fixed to a camera body 1 with a screw 8. Further, the contact 3 comes in contact with a film magazine 7.

Figure 3:
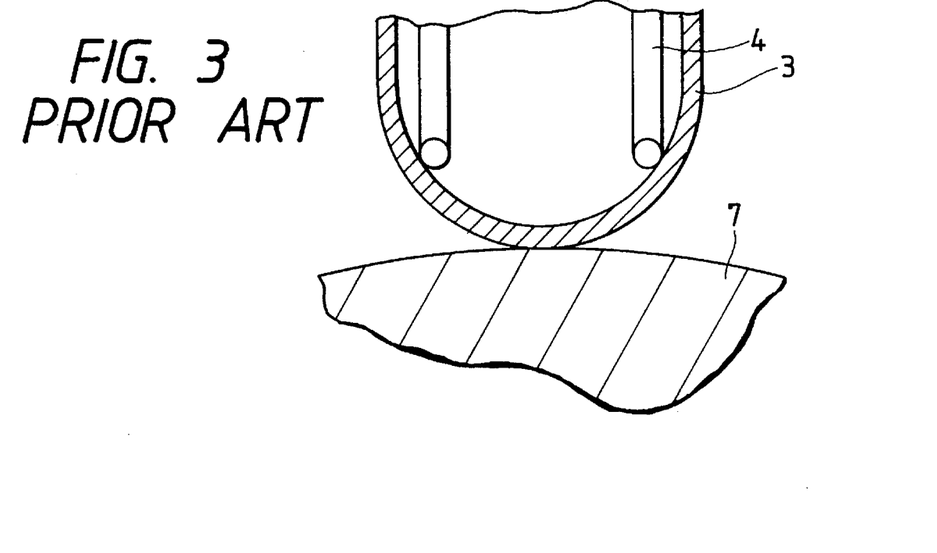
FIG. 3 is a partial sectional enlarged view showing a contact and a data pattern on the outer periphery of the magazine in the prior art.

FIG. 3 is a partial sectional enlarged view showing the contact and a data pattern on the outer periphery of the magazine. As illustrated in FIG. 3, the contact 3 comes in point-contact with the unillustrated data record pattern of the film magazine 7.

Figure 4:
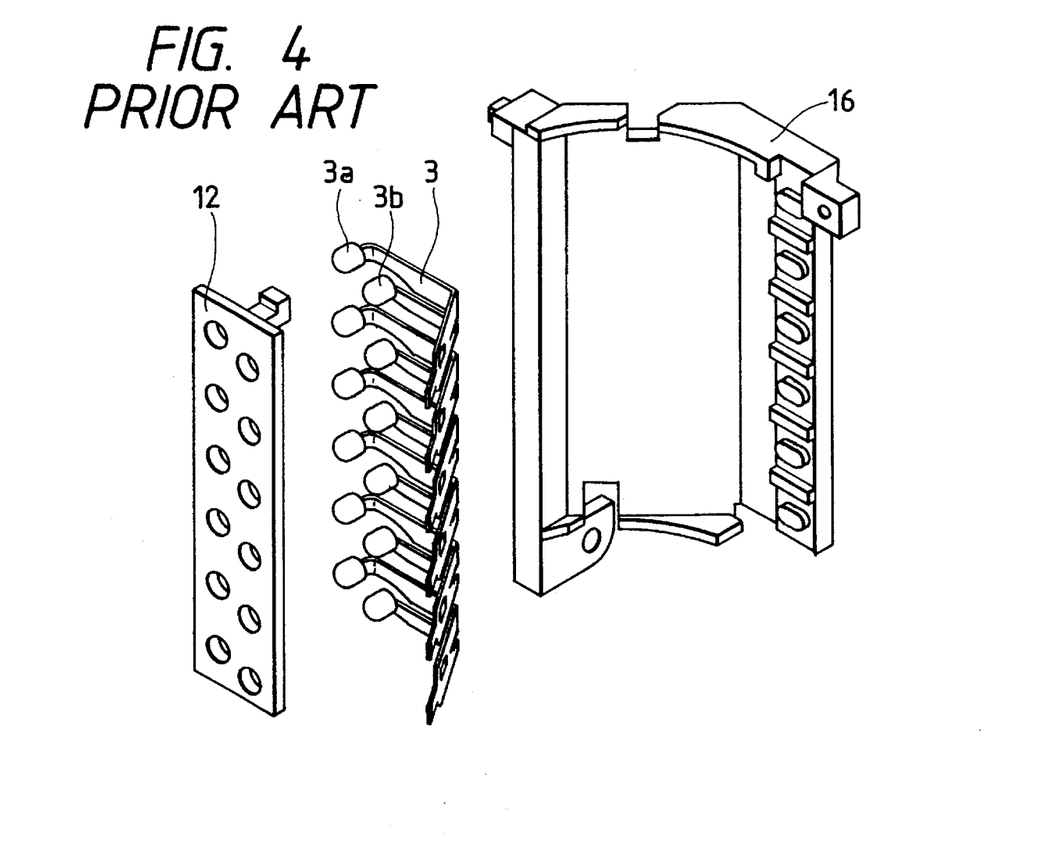
FIG. 4 is a fragmentary perspective view illustrating an improved DX encoded film data detecting mechanism in the prior art.

FIG. 4 is a fragmentary perspective view illustrating an improved DX encoded film data detecting mechanism in the prior art. Referring to FIG. 4, two rows of through-holes are formed in a contact holding member 12, and the contacts 3 are arrayed 3a, 3b corresponding to the through-holes.

Figure 5:
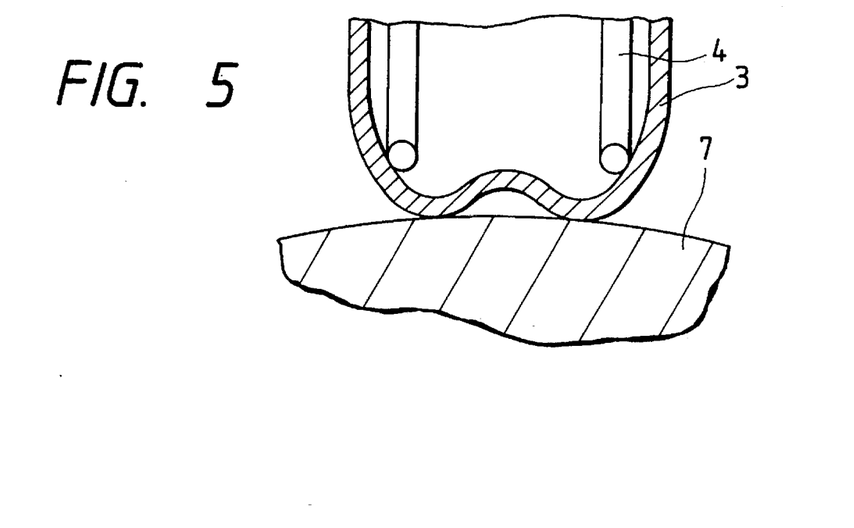
FIG. 5 is a view of assistance in explaining collapse working effected on a contact surface of the contact but shows an improvement of the contact in the prior art.

FIG. 5 shows an improvement applied to the conventional contact, wherein collapse working is effected on the contacting surface of the contact 3.

According to the conventional construction described above, an insulating material is interposed between the contact on the side of the camera body and the data record pattern on the outer periphery of the magazine. An oil film or an oxide is adhered to the surface of the contact, resulting in an increase in value of an electric resistance. This leads to such a phenomenon that a film sensitivity is misdetected or undetectable. As illustrated in FIG. 3, the magazine assumes a configuration of circular arc, and, hence, the contact is forced to come in a point-contact with the result that the construction is weak to an external factor.

There has hitherto been taken a method of applying Au plating exhibiting an excellency in terms of the electric characteristic and a chemical stability. However, because of a rise in cost of gold plating of nowadays, it is a general practice to decrease the cost by using, though inferior to Au plating, Ni plating or substitute plating.

According to the prior art, as a countermeasure against the above, the following method has hitherto been taken. Two or more paired contacts are provided on the data record pattern surface of the magazine as shown in FIG. 4, thereby increasing a contacting probability. Alternatively, as illustrated in FIG. 5, the surface of the tip portion of the signal contact member undergoes the collapse working to form a consecutive surface contact area, and a ring-like contact portion is thus obtained.

Referring to FIG. 4, the contacts come in two-point-contact with the magazine data record pattern, thus obtaining the paired contacts. However, a configuration, a size and a arrangement of the contacts with respect to the magazine data record pattern surface within a fixed range are limited. Besides, the configuration of the contact member becomes complicated, resulting in a difficulty of working. In addition, the two-point contacts are disposed with predetermined intervals but are composed of one member, and, therefore, the contact force differs depending on the contact portions 3a and 3b. Besides, there is a factor to cause a disorder in terms of the strengths of the contact forces of the respective contact portions because of the configuration being complicated. Accordingly, there arises a problem in which the contacts are forced to come in unstable contact with the magazine data record pattern surface due to a difference in magnitude of the force quantity between the respective contacts, which is derived from the scatter in terms of the contact force quantities thereof.

Further, referring to FIG. 5, because the collapse workings of the contact surfaces of the contacts are various, there is produced a difference in height of the ring-like contact surface with respect to wall surface of the magazine chamber between the contact surface areas thereof. This conduces to a problem wherein the contact area is conceived as a point contact, i.e., the contacts come in biased-point-contact with the circular-arc outer peripheral surface of the magazine and actually in one-point-contact therewith.

SUMMARY OF THE INVENTION

It is a primary object of the present invention, which was devised in view of the problems inherent in the prior art, to provide a DX encoded film data detecting mechanism capable of obtaining an easy-to-assemble characteristic and actualizing a resultant decrease in costs without spoiling a function while satisfying exact multipoint contacts.

To accomplish the above object, according to one aspect of the present invention, a DX encoded film data detecting mechanism of a camera detects film data from a film data pattern on an outer periphery of a magazine for a DX encoded film. The DX encoded film data detecting mechanism comprises a first contact member formed with an opening at a tip portion protruding by a predetermined amount so as to contact the film data pattern on the DX encoded film magazine disposed in a predetermined position in a magazine chamber from the opening formed in a wall of the film magazine of the camera. The DX encoded film data detecting mechanism also comprises a second contact member disposed in the opening of the first contact member and protruding by a predetermined amount so as to contact the film data pattern.

According to another aspect of the present invention, outserts of fixing proximal portions of the first contact member and the second contact members are formed of a mold resin. Any one of the first contact member and the second contact member is formed with protruded portions, while the other of these members is formed with recessed portions. The first contact member and the second contact member are integrally located and thus fixed by use of the protruded portions and the recessed portions.

According to still another aspect of the present invention, the contact of the second contact member is disposed at the diametric center of the opening of the tip portion of the first contact member and comes in contact with the film data pattern.

According to a further aspect of the present invention, the tip portion of the first contact member takes a truncated cup-like shape. The tip portion of the second contact member takes a conic shape.

According to a still further aspect of the present invention, the tip portion of the second contact member penetrates the center of the tip portion of the first contact member and comes in contact with the film data pattern.

According to the present invention, the two kinds of contact members make motions in the same coaxial direction, with a predetermined position serving as a base point. Besides, the first and second contact members are independent elastic members and therefore always follow and come in contact with the film data pattern area on the outer periphery of the magazine. Accordingly, the stable and exact multipoint contacts can be attained. Further, the first and second contact members are unitized and therefore excellent in terms of the assembling property.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

An embodiment of the present invention will hereinafter be described in detail with reference to the drawings.

Figure 6:
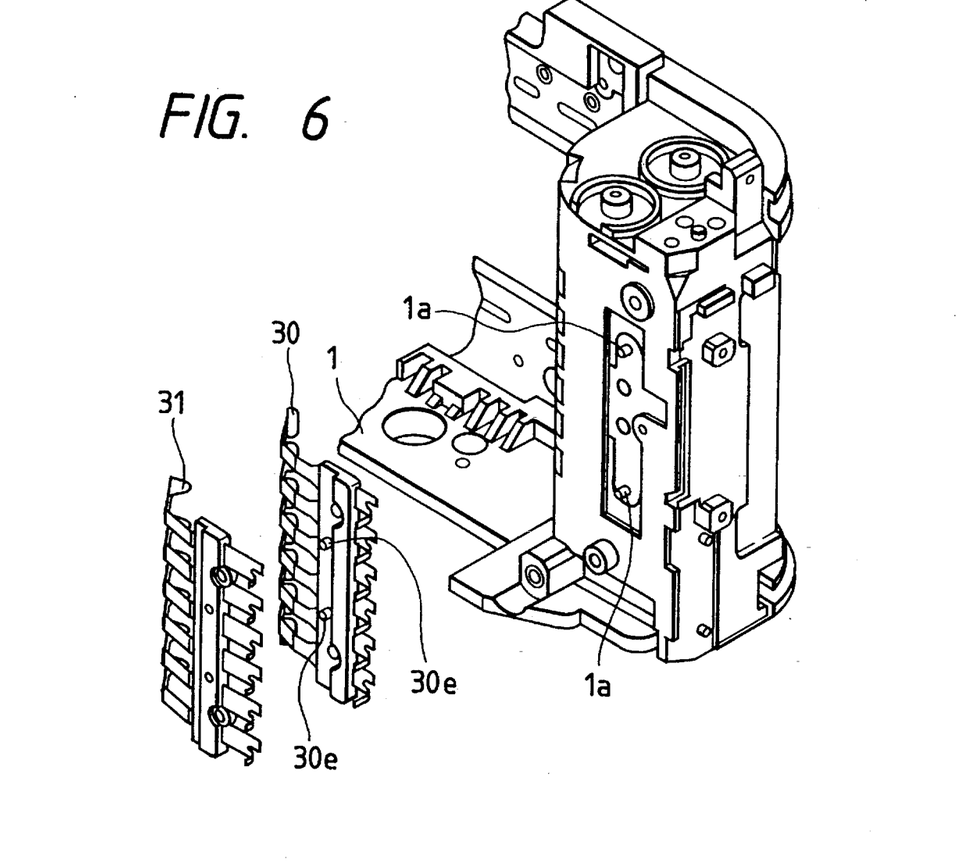
FIG. 6 is a fragmentary perspective view showing one embodiment of a structure of mounting a contact member unit of a DX encoded film contact data detecting mechanism of a camera into a camera body according to the present invention.
Figure 7:
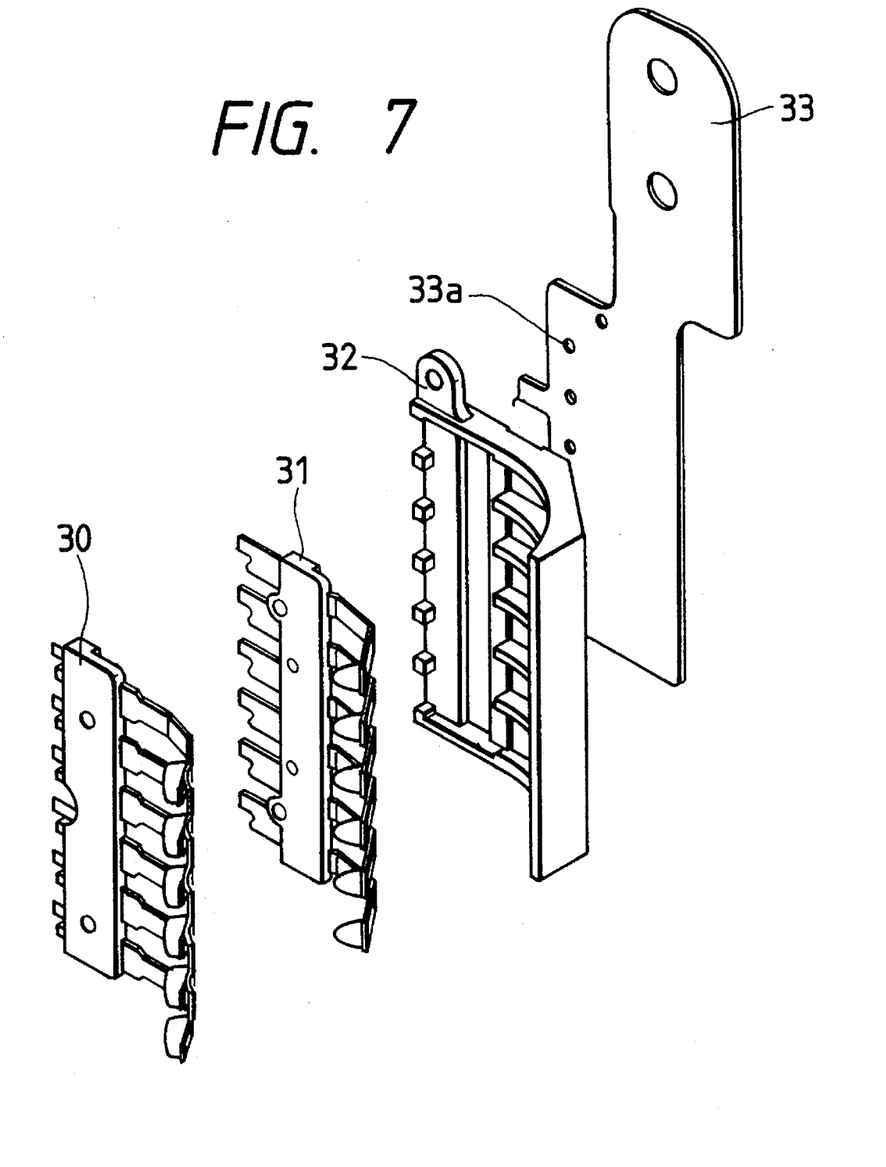
FIG. 7 is a perspective view illustrating the contact member unit and members constituting the same unit in this embodiment.
Figure 8A:
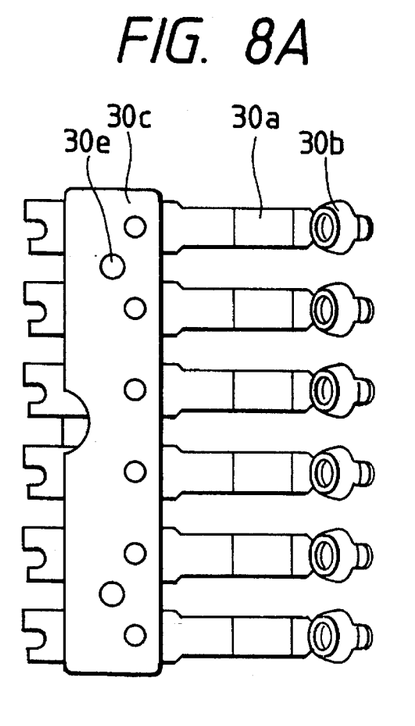
FIGS. 8A, 8B and 8C are front, top and perspective views of two contact members in this embodiment.
Figure 8B:
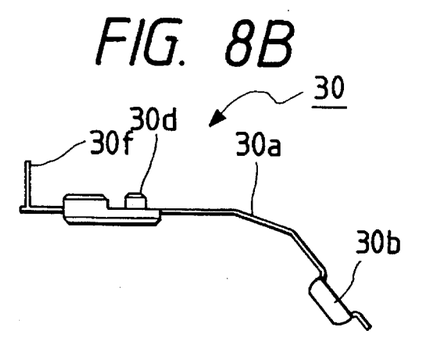
Figure 8C:
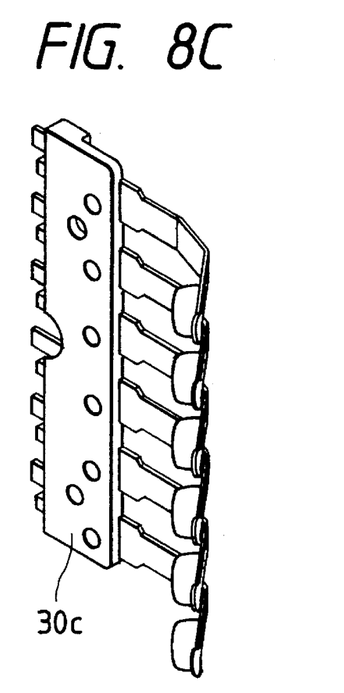
Figure 9A:
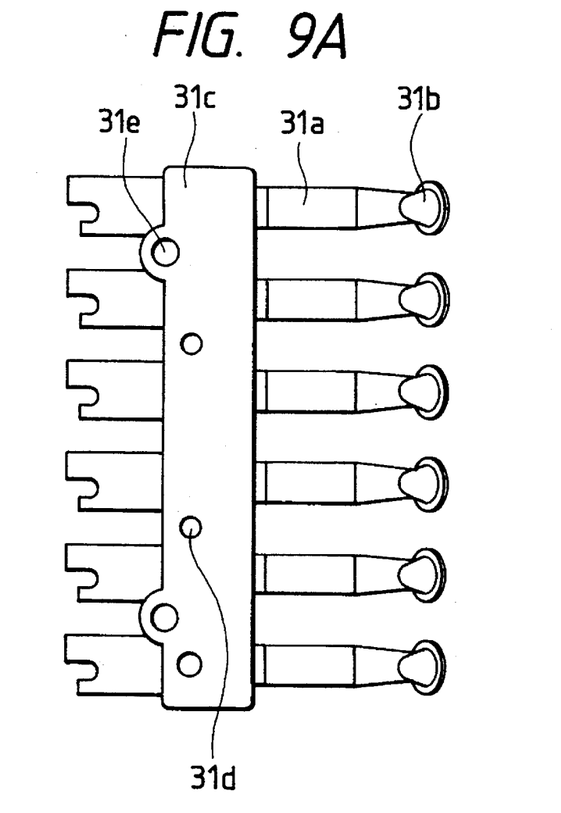
FIGS. 9A, 9B and 9C are front, top and perspective views of the two contact members in this embodiment.
Figure 9B:
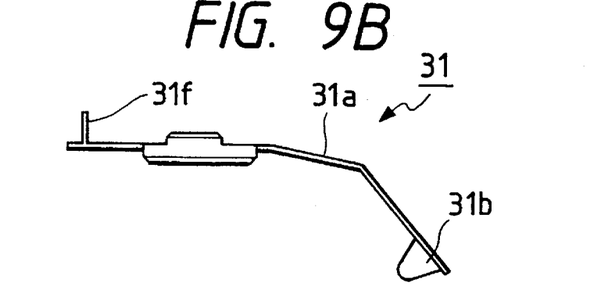
Figure 9C:
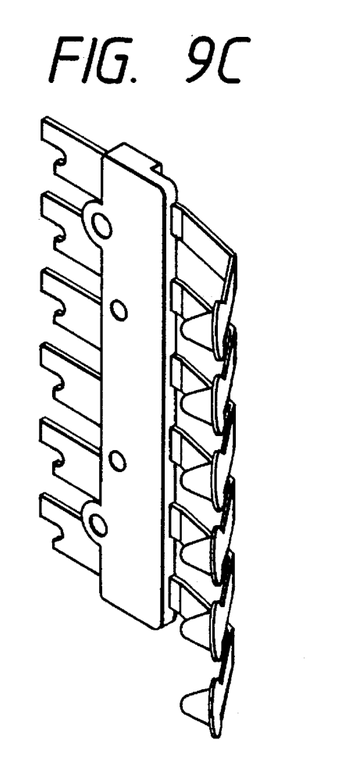
Figure 10A:
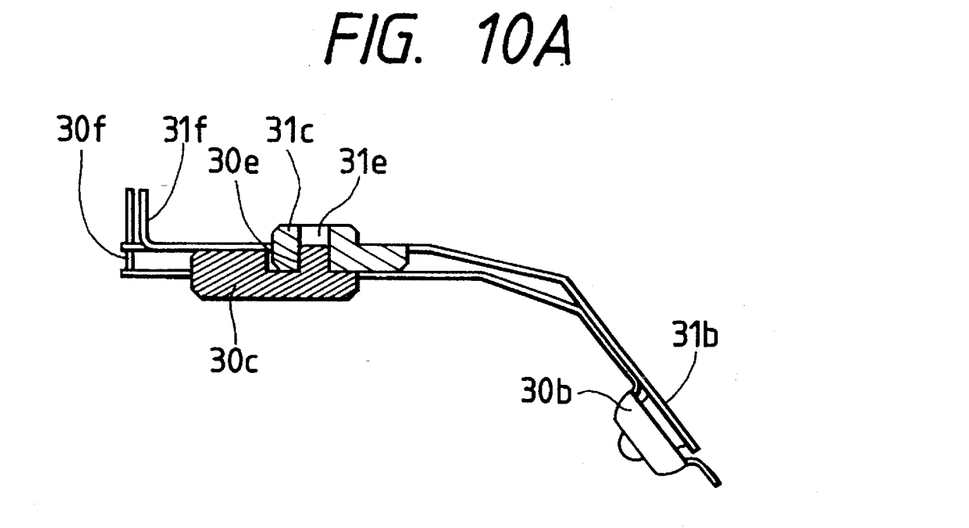
FIG. 10A is an explanatory partial sectional view of the two contact member units in this embodiment.
Figure 10B:
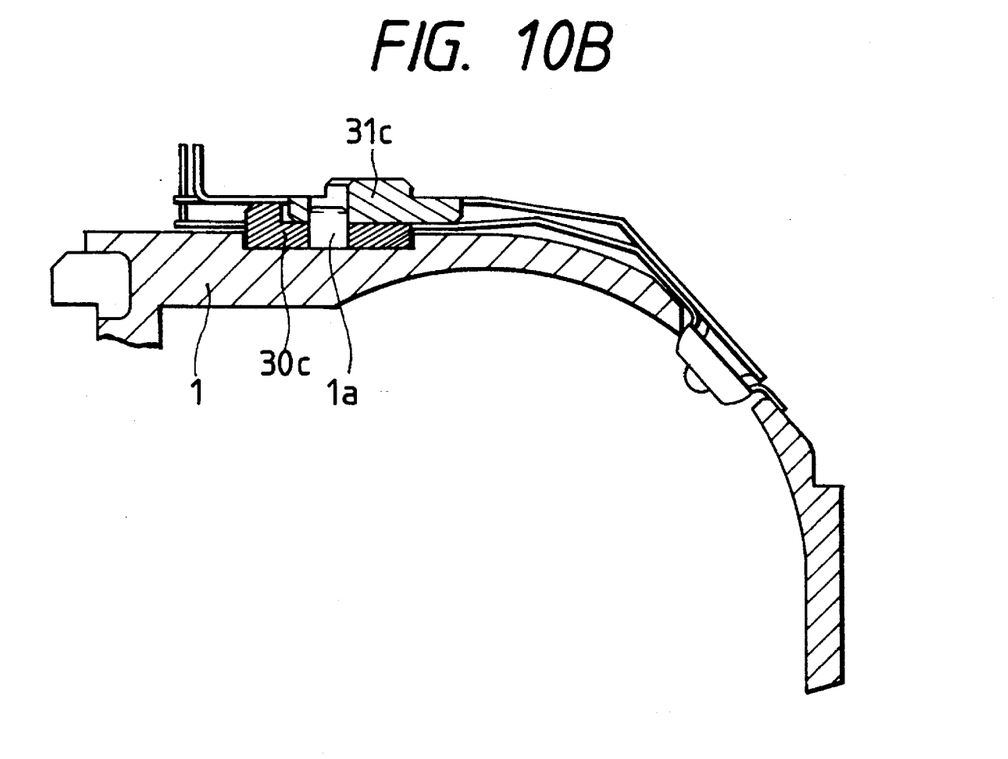
FIG. 10B is an explanatory sectional view of a structure of mounting the two contact member units into the body in this embodiment.
Figure 11:
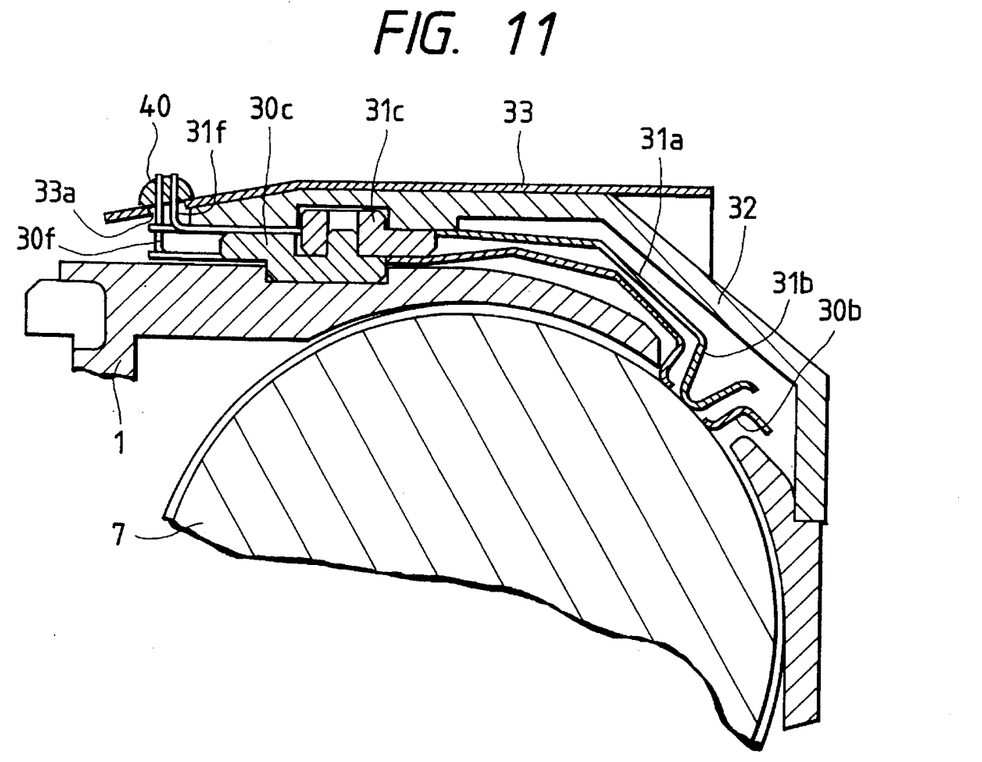
FIG. 11 is a sectional view showing a state when the film magazine is loaded.
Figure 12:
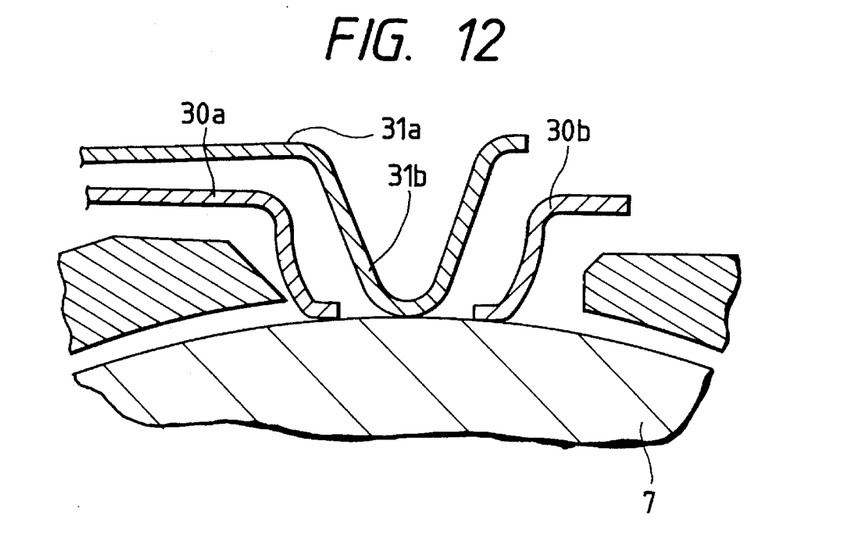
FIG. 12 is a partial sectional enlarged view showing a contact state of the contact area of the contact when the film magazine is loaded in this embodiment.

FIG. 6 is a fragmentary perspective view illustrating one embodiment of a structure of mounting a contact member unit of a DX encoded film contact data detecting mechanism of a camera into a camera body according to the present invention. FIG. 7 is a perspective view illustrating the contact member unit and members constituting the same unit. FIGS. 8A to 8C are front, top and perspective views of one contact member. FIGS. 9A to 9C are front, top and perspective views of the other contact member. FIG. 10A is a partial sectional view illustrating of two contact member units. FIG. 10B is a sectional view illustrating a structure of mounting the two contact member units into the camera body. FIG. 11 is a sectional view showing a state when a film magazine is loaded. FIG. 12 is a partial sectional enlarged view showing a contact state of the contact member contacting portion when the film magazine is loaded.

Structures and configurations of the two contact member units will be explained with reference to FIGS. 8A to 8C and 9A to 9C. Referring to FIGS. 8A to 8C, one contact member unit 30 has a contact member 30a. The contact member 30a includes a contact tip 30b. The contact tip 30b assumes a cup-like shape at the tip of the contact member as a contact tip portion 30b having an opening formed in a cup bottom in such a configuration that the outer peripheral portion of the cup bottom is left. The contact member 30a is formed with an outsert by use of a mold resin 30c as a fixing proximal portion to form a protruded portion 30d, thus unitizing these members. Referring to FIGS. 9A to 9C, the other contact member unit 31 has a contact member 31a. The contact member 31a includes a contact tip portion 31b assuming a conic shape a the tip of the contact member. The outsert of the contact member 31a is formed of a mold resin 31c as a fixing proximal portion to form a hole 31d, thus unitizing these members.

Note that the mold resin 30c may be formed with a hole, while the mold resin 31c may be provided with a protruded portion for a convenience of designing.

FIG. 6 is a perspective view illustrating a structure of mounting the thus unitized contact units 30, 31 into the camera body. FIG. 10A is a sectional view showing how the two contact units are located and fitted to each other. FIG. 10B is a sectional view showing how the units are located and mounted into a camera body 1. The hole 30e of the contact unit 30 is fixedly fitted to a camera body protruded portion 1a. The hole 31e of the contact unit 31 is located and fitted to the protruded portion 30e of the contact unit 30. At the same time, the center of the opening of the contact tip portion 30b of the contact unit 30 and the center of the contact tip portion 31b of the contact unit coincide with each other in a coaxial relationship. Determined is an amount of protrusion of the contact tip portion 31b of the contact unit 31 with respect to the opening of the contact tip portion 30b, and a fixation by fastening a screw to the camera body 1 is done through a presser member 32. The contact units 30, 31 are connected in their electric packaging in such a way that connection contact pieces 30f, 31f including portions bent at 90° at their rear edges of the contact members 30a, 31a are inserted and connected to connection holes 33a of a flexible printed board 33 and then soldered by solders 40.

Further, the two contact members when the film magazine is loaded will be explained. FIG. 11 is the sectional view showing the state when the film magazine is loaded. FIG. 12 is the partial sectional enlarged view showing a contact state of the contact member contacting portions when the film magazine is loaded. When the film magazine is loaded, a magazine-side data record pattern surface comes in contact with the outer peripheral surface of the opening of the cup-shaped bottom of the contact tip portion 30b, and the conic tip of the contact tip portion 31 is also brought into contact with the magazine-side data record pattern surface. The center of the opening of the contact tip portion 30b and the center of the conic tip of the contact tip portion 31b are coaxial, and the contact member 31a follows the contact member 30a in such a form as to secure the centers of the two tips, thus obtaining an independent elastic motion.

The thus constructed DX encoded film contact data detecting mechanism according to the present invention includes the two kinds of independent contact units. When the two contact units are located by fitting the protruded portion 30d of the fixing proximal portion 30c of the contact unit 30 is fitted into the hole 31d of the fixing proximal portion 31c of the contact unit 31, the center of the opening of the contact member tip portion 30b of the contact unit 30 coincides with the center of the contact member tip portion 31b of the contact unit 31. Besides, the two contact units 30, 31 are fixedly fitted to each other in such a form as to secure a predetermined amount of protrusion of the contact member tip portion 31b from the opening surface of the contact member tip portion 30b. Consequently, the centers of the contact member tip portions 30b, 31b easily coincide with each other, whereby a stable assembly can be attained.

Further, when the film magazine is loaded, the center of the opening of the contact member tip portion 30b of the contact unit 30 and the center of the conic tip portion of the contact member tip portion 31b of the contact unit 31 are exactly in the coaxial relationship. Besides, the elastic motion is obtained in such a form that the two contact members are independent. Hence, an amount of the contact force is stable, and, besides, there are obtained the exact multipoint-contacts with respect to the magazine data record pattern surface.

Further, as described above, the central positions of the tip portions are secured, and the elastic motion of the independent contact member can be obtained. It is therefore possible to stably surely detect that data on any kinds of DX encoded films.

As discussed above, the contact mechanism for detecting the data of the DX encoded film according to the present invention has the construction by which there is secured the predetermined amount of protrusion of the contact tip portion of the second contact member disposed coaxially with the opening portion of the contact tip portion of the first contact member, and the two contact members obtain the independent elastic motions. Hence, the contact tip portions always come in multi-contacts with the DX encoded film data pattern portion, thereby exhibiting such a effect that the conduction can be stably detected.

Further, the outsert of each of the two contact members is formed of the mold resin, thus providing the fixing proximal portion formed with the protrusion on one side and the recessed portion on the other side. The above members are unitized with the protrusion and the recessed portion serving as a basis for the integration, and this leads to the effects in which the locating and fixing processes are facilitated, and the assembling characteristic is also excellent.

It is apparent that, in this invention, a wide range of different working modes can be formed based on the invention without deviating from the spirit and scope of the invention. This invention is not restricted by its specific working modes except being limited by the appended claims.

What is claimed is:

1. A DX encoded film data detecting mechanism of a camera, for detecting film data from a film data pattern on an outer periphery of a magazine for a DX encoded film, comprising:

a first contact member formed with an opening at a tip portion protruding by a predetermined amount so as to contact the film data pattern on the DX encoded film magazine disposed in a predetermined position in a magazine chamber from the opening formed in a wall of the film magazine of the camera; and a second contact member disposed in the opening of said first contact member and protruding by a predetermined amount so as to contact the film data pattern.

2. A DX encoded film data detecting mechanism of a camera according to claim 1, wherein outserts of fixing proximal portions of said first contact member and said second contact members are formed of a mold resin.

3. A DX encoded film data detecting mechanism of a camera according to claim 1, wherein said first contact member and said second contact member respectively exhibit independent elasticities.

4. A D encoded film data detecting mechanism of a camera according to claim 1, wherein any one of said first contact member and said second contact member is formed with protruded portions, while the other of said members is formed with recessed portions, and said first contact member and said second contact member are integrally located and thus fixed by use of the protruded portions and the recessed portions.

5. A DX encoded film data detecting mechanism of a camera according to claim 1, wherein a contact of said second contact member is disposed at the diametric center of the opening of the tip portion of said first contact member and comes in contact with the film data pattern.

6. A DX encoded film data detecting mechanism of a camera according to claim 1, wherein the tip portion of said first contact member takes a truncated cup-like shape, and the tip portion of said second contact member takes a conic shape.

7. A DX encoded film data detecting mechanism of a camera according to claim 4, wherein the tip portion of said second contact member penetrates the center of the tip portion of said first contact member and comes in contact with the film data pattern.

* * * * *

UNITED STATES PATENT AND TRADEMARK OFFICE
CERTIFICATE OF CORRECTION

PATENT NO. : 5,548,360

DATED : August 20, 1996

INVENTOR(S) : Kimio UEMATSU et al.

It is certified that error appears in the above-indentified patent and that said Letters Patent is hereby corrected as shown below:

Column 6, Line 39 (CLAIM 4) "D" should be --DX--.

Signed and Sealed this

Seventeenth Day of December, 1996

Attest:

BRUCE LEHMAN

*Attesting Officer*   *Commissioner of Patents and Trademarks*